United States Patent
Ward et al.

(10) Patent No.: US 8,848,222 B2
(45) Date of Patent: Sep. 30, 2014

(54) MECHANISM FOR PREVIEWING SECURE PRINT JOBS

(75) Inventors: David Ward, Broomfield, CO (US); Randell Rivadeneira, Broomfield, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 379 days.

(21) Appl. No.: 13/253,249

(22) Filed: Oct. 5, 2011

(65) Prior Publication Data
US 2013/0088746 A1    Apr. 11, 2013

(51) Int. Cl.
*G06F 3/12*    (2006.01)

(52) U.S. Cl.
CPC ............ *G06F 3/1208* (2013.01); *G06F 3/1256* (2013.01); *G06F 3/1222* (2013.01); *G06F 3/1238* (2013.01); *G06F 3/1288* (2013.01)
USPC ........ 358/1.15; 358/1.18; 358/1.13; 709/203; 709/206

(58) Field of Classification Search
None
See application file for complete search history.

(56) References Cited

U.S. PATENT DOCUMENTS

| | | | | |
|---|---|---|---|---|
| 6,621,590 B1 * | 9/2003 | Livingston | ................... | 358/1.15 |
| 7,080,117 B2 * | 7/2006 | de Pinto et al. | ............... | 709/203 |
| 7,099,027 B1 * | 8/2006 | Barry et al. | ................... | 358/1.15 |
| 7,535,591 B2 * | 5/2009 | Kujirai | .......................... | 358/1.16 |
| 7,599,086 B2 * | 10/2009 | Nakagiri et al. | ............. | 358/1.15 |
| 7,620,177 B2 | 11/2009 | Ibrahim et al. | | |
| 8,055,993 B2 * | 11/2011 | Petri | ............................. | 715/205 |
| 8,665,476 B2 * | 3/2014 | Price et al. | ................... | 358/1.15 |
| 8,707,204 B2 * | 4/2014 | Horvitz et al. | ................ | 715/804 |
| 2004/0105123 A1 * | 6/2004 | Fritz et al. | ..................... | 358/1.16 |
| 2005/0088668 A1 * | 4/2005 | Sesek et al. | ..................... | 358/1.1 |
| 2007/0182991 A1 | 8/2007 | Matsuda | | |
| 2007/0285707 A1 | 12/2007 | Muramatsu | | |
| 2008/0115047 A1 * | 5/2008 | Petri | ............................. | 715/205 |
| 2008/0259390 A1 | 10/2008 | Murase | | |
| 2009/0046311 A1 | 2/2009 | Asai | | |
| 2010/0277764 A1 | 11/2010 | Yamazaki | | |

* cited by examiner

*Primary Examiner* — Ashish K Thomas
(74) *Attorney, Agent, or Firm* — Blakely, Sokoloff, Taylor & Zafman LLP

(57) ABSTRACT

A computer generated method disclosed. The method includes receiving a print job data stream, determining if the print job data stream comprises a secure print job, and inserting a control operator to designate a secure print job data stream if the print job data stream comprises a secure print job.

15 Claims, 5 Drawing Sheets

MECHANISM FOR PREVIEWING SECURE PRINT JOBS

FIELD OF THE INVENTION

The invention relates to the field of printing systems. Particularly, the invention relates to securing confidential print jobs.

BACKGROUND

Computing centers that employ one or more printers to serve a group of users, such as a networked group or other work group, typically rely on the printers to batch process print jobs (e.g., print-out a series of different print jobs in succession). Often a user of the group needs to print a job at a group printer that includes confidential or sensitive documents. However, in such instances it may be inappropriate to immediately print such a job and have the job placed in a printer output bin where other users may have access. Accordingly, many group printers provide a secure print option.

Secure print enables a user to designate a document as secure prior to printing. In response, the print job instructs the printer to hold the job at the printer with a security number (PIN), rather than immediately printing. The user is then required to physically go to the printer panel and input the PIN number in order to print the document.

Another feature of secure print jobs is that no part of a secure job is stored on persistent storage (e.g., hard disk). However, this feature eliminates many types of print job data streams jobs that can be sent to a printer in Secure Print mode. For example, Portable Document Format (PDF) jobs typically must be spooled prior to being processed for printing. Moreover, PDF files include indexing information for each page to allow for segmentation.

Postscript print jobs, however, can be streamed with all segmentable pages (page boundaries) being determined without the need for the job to be spooled. Postscript is a dynamically typed concatenative programming language that includes a postscript interpreter that is used to rasterize the job during print processing. Thus, Postscript is often implemented for secure print jobs.

Print preview is also a feature implemented at printers, which allows a user to view all or part of a job in a reduced size and reduced resolution view (e.g., "thumbnails"). The preview of a job can typically be viewed in any order (e.g., pages 1, 100, 3, 50, etc), where the first page of a job is shown to a user without user intervention. Additional pages are requested on the printer console.

However, previewing secure print jobs poses a problem in that rasterized pages have to be written to disk for pages that have been viewed and requested again later (e.g., requests: page1, page 4, page 1) and for pages requested before the current page being viewed (e.g., page 1 when the current page being viewed is 5).

Accordingly, a mechanism to preview secure print jobs without writing rasterized images is desired.

SUMMARY

In one embodiment a computer generated method is disclosed. The method includes receiving a print job data stream, determining if the print job data stream comprises a secure print job, and inserting a control operator to designate a secure print job data stream if the print job data stream comprises a secure print job.

In another embodiment, a method includes receiving a request to preview a page of a secure print job at a printer, determining if the requested page is from a new print job received at the printer, determining if the requested page is the next page in order of the print job if the requested page is not from a new print job, rasterizing the requested page if the requested page is the next page in order of the print job and displaying the requested page at a printer user interface (UI) console.

In a further embodiment, a printing system is disclosed. The printing system includes a printer and print server including a printing software product to receive a print job data stream, determine if the print job data stream comprises a secure print job and insert a control operator to designate a secure print job data stream if the print job data stream comprises a secure print job.

BRIEF DESCRIPTION OF THE DRAWINGS

A better understanding of the present invention can be obtained from the following detailed description in conjunction with the following drawings, in which.

DETAILED DESCRIPTION

A mechanism to preview secure print jobs is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
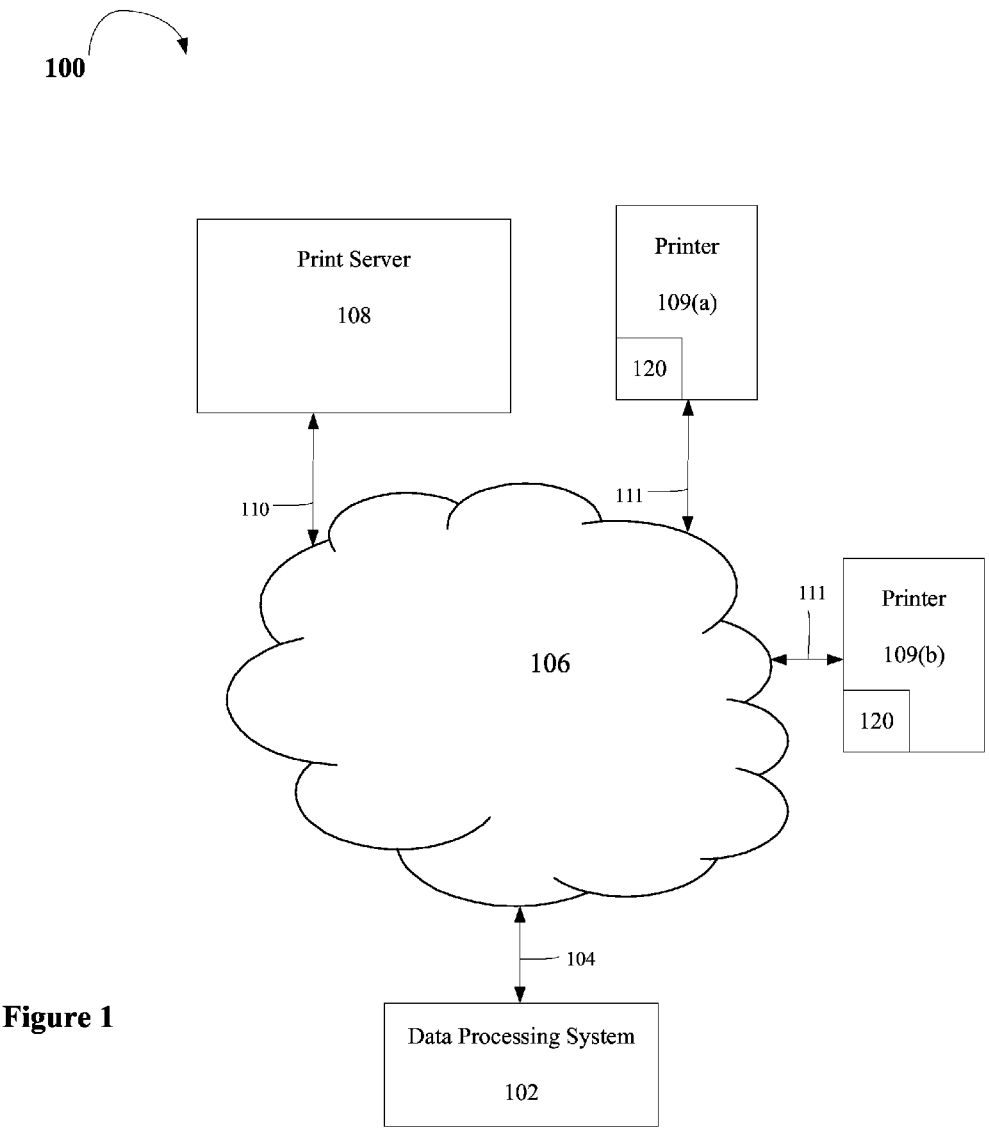
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system, or other operating system, and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 100 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111.

In one embodiment, a print application at data processing system 102 allows a user to select the desired print server 108 and submit requests for service to printer 109 via print server 108 over network 106. In other embodiments, additional/alternative presentation architectures (e.g., Printer Job Language (PJL), PostScript, etc.) may be implemented at the print application. Printers 109 may also include user interface consoles 120 that enable users to preview pages of a print job at a printer 109 prior to printing Although described as separate entities, other embodiments may include print server 108 being incorporated in one or more of the printers 109. In yet further embodiments, the print server and printer may be physically separate entities. Therefore, the data processing system network depicted in FIG. 1 is selected for the purposes of explaining and illustrating the present invention and is not intended to imply architectural limitations. Those skilled in the art will recognize that various additional components may be utilized in conjunction with the present invention.

According to one embodiment, print server 108 implements a printing software product that manages the printing of documents from data processing system 102 and one or more of printers 109. In other embodiments, the printing software product manages printing of documents from multiple data processing systems 102 to the one or more printers 109. In a further embodiment, the printing software product may be implemented using either InfoPrint Manager (IPM) or InfoPrint ProcessDirector (IPPD), although other types of printing software may be used instead.

Figure 2:
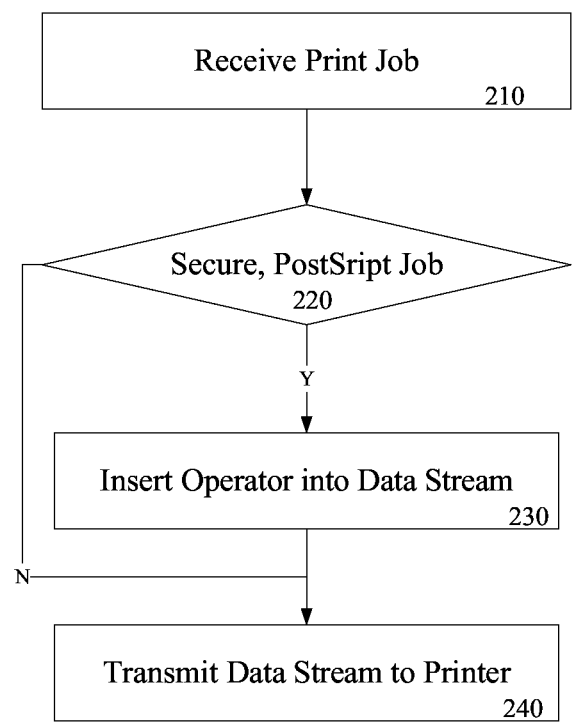
FIG. 2 is a flow diagram illustrating one embodiment of a process performed by a printing software produce for previewing secure print jobs.

In one embodiment, the printing software product processes a print job data stream. If the printing software product detects that the job is a secure print postscript job, the printing software product inserts a loop postscript control operator ({ . . . .}loop) into the job data stream. FIG. 2 illustrates one embodiment of a process performed by the printing software product to enable a preview of secure print jobs. At processing block 210, a print job is received.

At processing block 220, it is determined whether the print job is a secure print postscript job. If the job is not a secure print postscript job, the data stream is transmitted to a printer 109, processing block 240. However if the job is a secure print postscript job, the loop postscript control operator is inserted into the data stream, processing block 230, prior to transmission to the printer 109.

Figure 3:
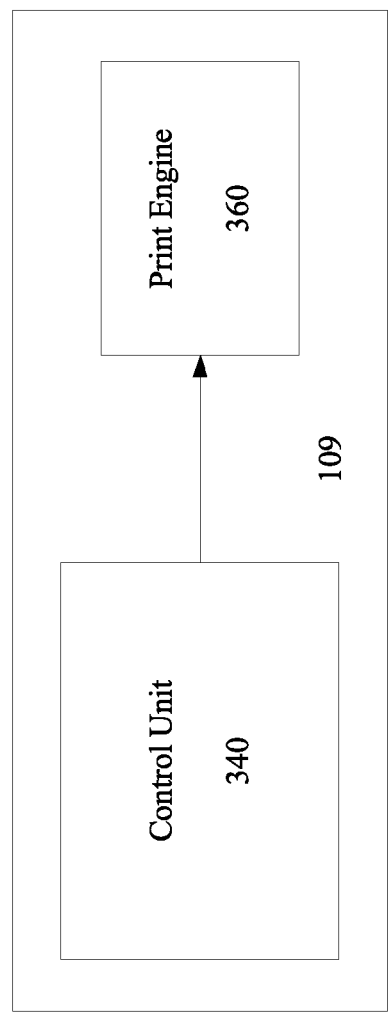
FIG. 3 illustrates one embodiment of a printer.

FIG. 3 illustrates one embodiment of a printer 109. Printer 109 includes a control unit 340 and a print head 360. Control unit 340 processes and renders objects received from print server and provides sheet maps for printing to print head 360. Control unit 340 includes a rasterizer to prepare pages for printing. Particularly, rasterizer includes a raster image processor (RIP) that converts text and images into a matrix of pixels (bitmap) that will be printed on a page.

Figure 4:
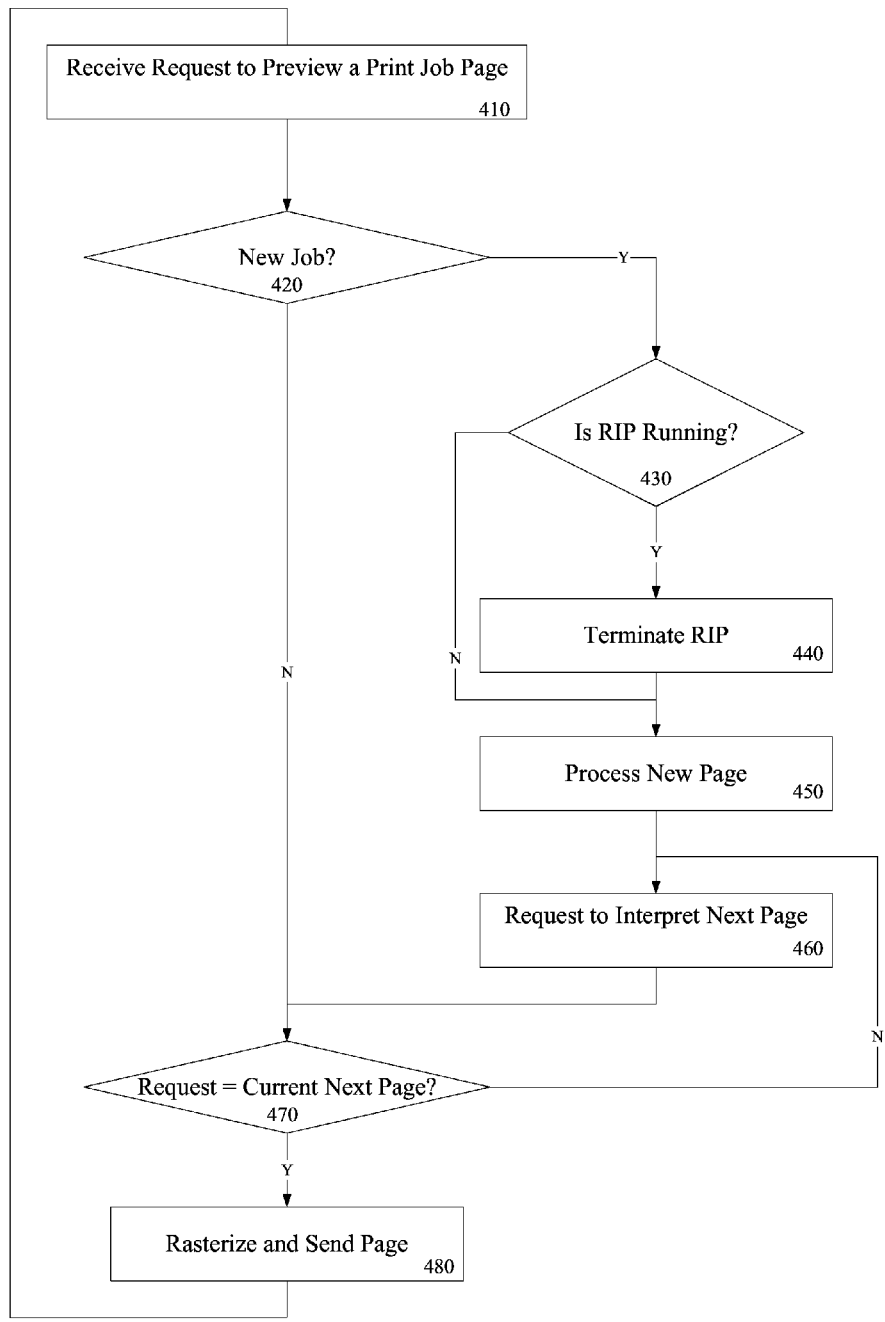
FIG. 4 is a flow diagram illustrating one embodiment of a process performed by a printer.

In one embodiment, control unit 340 enables a secure postscript job to be interpreted infinitum upon encountering the loop control operator. In a further embodiment, the job may be terminated by control unit 340 when either there are no more requests for the job or a new job is received. FIG. 4 is a flow diagram illustrating one embodiment of a process performed by control unit 340 upon receiving a request to preview a print job including the loop control operator.

At processing block 410, a request is received from the UI 120 console to preview a page of a print job. At processing block 420, it is determined whether the request is for a newly received job. If the request is for a new print job, it is determined whether the RIP is running at control unit 430. If so, the RIP is terminated, processing block 440, before beginning processing of the new request, processing block 450. Otherwise, control is forwarded directly to processing block 450. At processing block 460, a request is sent to interpret the next page of the print job (e.g., the page that follows the current page being processed). Control is then forwarded to decision block 470, discussed below.

If at decision block 420, it is determined that the job is not new, it is subsequently determined whether the requested page is the same as the current interpreted page of the print job, decision block 470. If the requested page is not the next page of the print job, control is returned to processing block 460 where a request is sent to rasterize the next page of the print job. However if the requested page is the next page of the print job, the preview page is rasterized and forwarded to UI 120 control panel, processing block 480.

Figure 5:
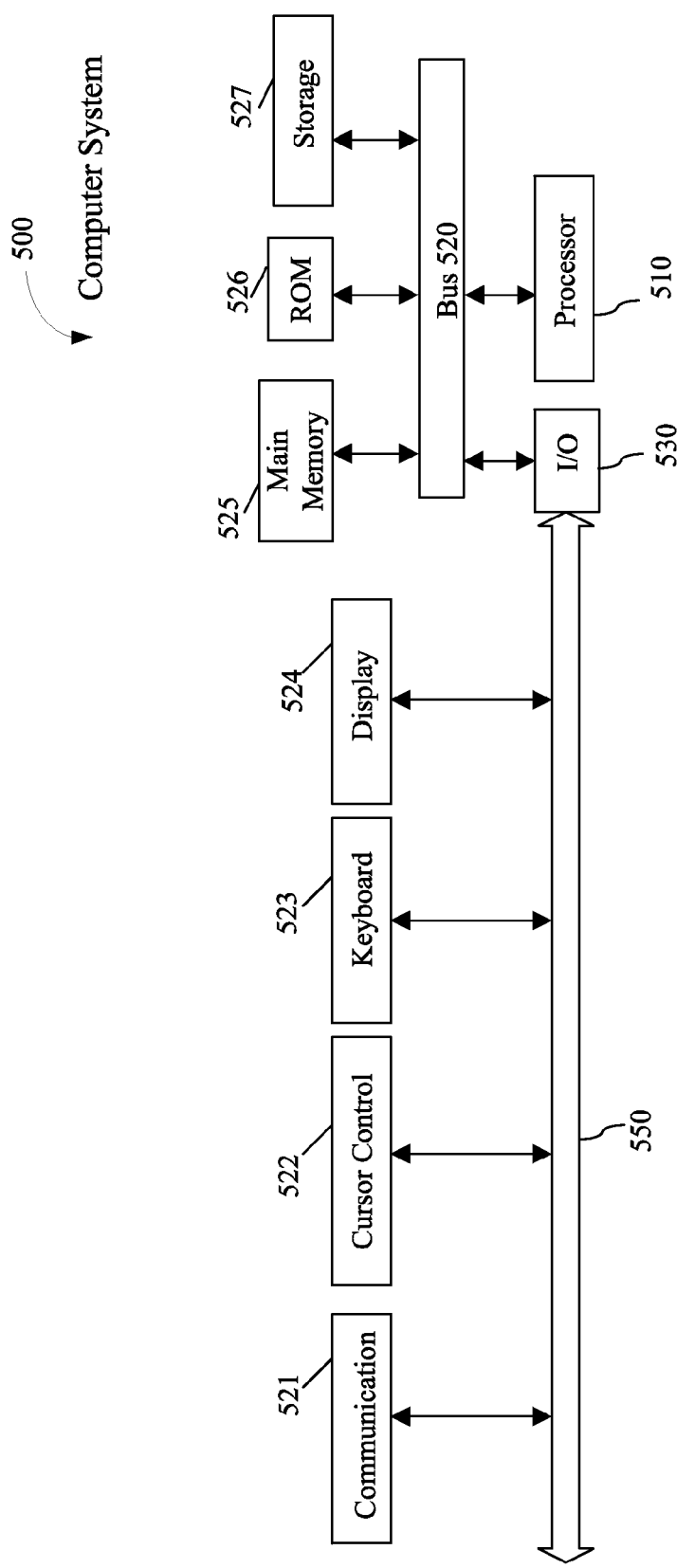
FIG. 5 illustrates one embodiment of a computer system.

FIG. 5 illustrates a computer system 500 on which data processing system 102 and/or server 108 may be implemented. Computer system 500 includes a system bus 520 for communicating information, and a processor 510 coupled to bus 520 for processing information.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524, an input device (e.g., an alphanumeric input device 323 and or a cursor control device 522). The communication device 521 is for accessing other computers (servers or clients). The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. An article of manufacture comprising a machine-readable medium including data that, when accessed by a machine, cause the machine to perform operations comprising:
   receiving a request to preview a page of a secure print job at a printer;
   determining if the requested page is from a new print job received at the printer;
   determining if the requested page is a current next page in order of the print job if the requested page is not from a new print job;
   rasterizing the requested page if the requested page is the current next page in order of the print job; and
   displaying the requested page at a printer user interface (UI) console.

2. The article of manufacture of claim 1 comprising a machine-readable medium including data that, when accessed by a machine, further causes the machine to perform operations comprising:
   receiving a second request to preview a page of a secure print job at a printer;
   determining if the second requested page is from a new print job received at the printer;
   determining if the second requested page is the current next page in order of the print job if the requested page is not from a new print job; and
   requesting to interpret the second requested page if the second requested page is not the next page in order of the print job.

3. The article of manufacture of claim 1 comprising a machine-readable medium including data that, when accessed by a machine, further causes the machine to perform operations comprising:
   determining if a raster image processor (RIP) operation is running if the requested page is from a new print job received at the printer;
   if so, terminating the RIP operation; and
   processing a review page for the requested page.

4. The article of manufacture of claim 3 comprising a machine-readable medium including data that, when accessed by a machine, further causes the machine to perform operations comprising requesting to interpret the next page in order of the print job.

5. The article of manufacture of claim 4 comprising a machine-readable medium including data that, when accessed by a machine, further causes the machine to perform operations comprising:
   determining if the requested page is the current next page in order of the print job if the requested page is not from a new print job;
   rasterizing the requested page if the requested page is the next page in order of the print job; and
   displaying the requested page at a printer user interface (UI) console.

6. A printing system comprising
   a user interface (UI) console; and
   a controller to receive a request from the UI console to preview a page of a secure print job at the UI console, determine if the requested page is from a new print job received at the printer, determine if the requested page is a current next page in order of the print job if the requested page is not from a new print job, and rasterize the requested page if the requested page is the next page in order of the print job.

7. The printing system of claim 6 wherein the UI console displays the requested page.

8. The printing system of claim 6 wherein the controller further receives a second request to preview a page of a secure print job at a printer, determines if the second requested page is from a new print job received at the printer, determines if the second requested page is the current next page in order of the print job if the requested page is not from a new print job and requests to interpret the second requested page if the second requested page is not the next page in order of the print job.

9. The printing system of claim 6 wherein the controller further determines if a raster image processor (RIP) operation is running if the requested page is from a new print job received at the printer; if so, terminates the RIP operation and processes a review page for the requested page.

10. The printing system of claim 9 wherein the controller further requests to interpret the next page in order of the print job.

11. The printing system of claim 10 wherein the controller further determines if the requested page is the current next page in order of the print job if the requested page is not from a new print job, rasterizes the requested page if the requested page is the current next page in order of the print job; and displays the requested page at a printer user interface (UI) console.

12. A method comprising:
   receiving a request to preview a page of a secure print job at a printer;
   determining if the requested page is from a new print job received at the printer;
   determining if the requested page is a current next page in order of the print job if the requested page is not from a new print job;
   rasterizing the requested page if the requested page is the current next page in order of the print job; and
   displaying the requested page at a printer user interface (UI) console.

13. The method of claim 12 further comprising:
   receiving a second request to preview a page of a secure print job at a printer;
   determining if the second requested page is from a new print job received at the printer;
   determining if the second requested page is the current next page in order of the print job if the requested page is not from a new print job; and
   requesting to interpret the second requested page if the second requested page is not the next page in order of the print job.

14. The method of claim 12 further comprising:
determining if a raster image processor (RIP) operation is running if the requested page is from a new print job received at the printer;
if so, terminating the RIP operation; and
processing a review page for the requested page.

15. The method of claim 14 further comprising:
requesting to interpret the next page in order of the print job;
determining if the requested page is the current next page in order of the print job if the requested page is not from a new print job;
rasterizing the requested page if the requested page is the next page in order of the print job; and
displaying the requested page at a printer user interface (UI) console.

* * * * *